(12) United States Patent
Arumugam et al.

(10) Patent No.: US 10,965,714 B2
(45) Date of Patent: *Mar. 30, 2021

(54) POLICY ENFORCEMENT SYSTEM

(71) Applicant: MICROSOFT TECHNOLOGY LICENSING, LLC, Redmond, WA (US)

(72) Inventors: Dilli Dorai Minnal Arumugam, Campbell, CA (US); Prasad Mujumdar, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,750

(22) Filed: Apr. 29, 2019

(65) Prior Publication Data

US 2019/0253460 A1    Aug. 15, 2019

Related U.S. Application Data

(63) Continuation of application No. 15/864,886, filed on Jan. 8, 2018, now Pat. No. 10,277,633, which is a
(Continued)

(51) Int. Cl.
*H04L 29/06* (2006.01)
*G06F 16/11* (2019.01)
(Continued)

(52) U.S. Cl.
CPC ............ *H04L 63/20* (2013.01); *G06F 16/122* (2019.01); *G06F 21/602* (2013.01);
(Continued)

(58) Field of Classification Search
CPC . H04L 63/20; H04L 63/0227; H04L 63/0428; H04L 63/0421; H04L 63/0281;
(Continued)

(56) References Cited

U.S. PATENT DOCUMENTS 5,537,548 A    7/1996  Fin
5,708,780 A    1/1998  Levergood
(Continued)

FOREIGN PATENT DOCUMENTS

WO    WO 2014/207554    12/2014

OTHER PUBLICATIONS

EP Extended European Search Report in European Application No. 16873927.4, dated Oct. 22, 2018, 7 pages.
(Continued)

*Primary Examiner* — Shahriar Zarrineh

(74) *Attorney, Agent, or Firm* — Fiala & Weaver P.L.L.C.

(57) ABSTRACT

Methods, systems, and apparatus, including computer programs encoded on computer storage media, for storing, by a policy enforcement system, a plurality of policies and data associating a plurality of user credentials with the plurality of policies; receiving, from a client device, a request for data from a file system, the request further comprising user credentials; forwarding the request for data to a second node that stores the data from the file system; receiving, from the node, the data from the file system; selecting from the plurality of policies, based on the received user credentials and the data associating the plurality of user credentials with the plurality of policies, one or more policies that correspond to the received user credentials; filtering, by the policy enforcement system, the data from the file system based on the one or more policies; and sending the filtered data to the client device.

20 Claims, 4 Drawing Sheets

Related U.S. Application Data continuation of application No. 14/868,265, filed on Sep. 28, 2015, now Pat. No. 9,866,592.

(51) Int. Cl.
  *G06F 21/60* (2013.01)
  *G06F 21/62* (2013.01)

(52) U.S. Cl.
  CPC ...... *G06F 21/6218* (2013.01); *H04L 63/0227* (2013.01); *H04L 63/0421* (2013.01); *H04L 63/0428* (2013.01); *H04L 63/0281* (2013.01)

(58) Field of Classification Search
  CPC ............... G06F 21/602; G06F 21/6218; G06F 17/30082; G06F 16/122; G06F 40/30; G06F 21/6245; G06F 21/6254
  USPC ......................................................... 713/168
  See application file for complete search history.

(56) References Cited

U.S. PATENT DOCUMENTS

| | | | |
|---|---|---|---|
| 6,178,505 B1 * | 1/2001 | Schneider | H04L 63/0218 713/168 |
| 6,226,372 B1 | 5/2001 | Beebe | |
| 6,463,470 B1 | 10/2002 | Mohaban | |
| 6,687,229 B1 | 2/2004 | Kataria | |
| 6,799,214 B1 * | 9/2004 | Li | H04L 29/12066 709/226 |
| 7,215,637 B1 * | 5/2007 | Ferguson | H04L 45/00 370/230.1 |
| 7,542,943 B2 | 6/2009 | Caplan | |
| 7,631,084 B2 | 12/2009 | Thomas | |
| 7,730,089 B2 | 6/2010 | Campbell | |
| 8,181,221 B2 | 5/2012 | Manickam et al. | |
| 8,185,931 B1 | 5/2012 | Reeves | |
| 8,196,183 B2 | 6/2012 | Smith | |
| 8,613,108 B1 | 12/2013 | Aggarwal | |
| 8,677,447 B1 | 3/2014 | Zuk et al. | |
| 8,683,560 B1 | 3/2014 | Brooker | |
| 8,769,692 B1 | 7/2014 | Muttik | |
| 8,930,410 B2 * | 1/2015 | Alton | G06F 16/2455 707/802 |
| 8,959,629 B2 * | 2/2015 | Scholte | H04L 63/123 726/22 |
| 8,984,608 B2 | 3/2015 | Sanno | |
| 9,069,436 B1 | 6/2015 | Fieweger | |
| 9,071,594 B2 | 6/2015 | Boulos et al. | |
| 9,183,407 B2 | 11/2015 | Meijer | |
| 9,576,147 B1 | 2/2017 | McClintock | |
| 9,584,517 B1 | 2/2017 | Roth | |
| 9,614,715 B2 | 4/2017 | Bhave | |
| 9,722,895 B1 | 8/2017 | Sarukkai | |
| 9,866,592 B2 | 1/2018 | Arumugam et al. | |
| 9,871,825 B2 | 1/2018 | Arumugam et al. | |
| 10,803,027 B1 * | 10/2020 | Rodgers | H04L 63/0876 |
| 2001/0023486 A1 | 9/2001 | Kayashima | |
| 2002/0007404 A1 | 1/2002 | Vange | |
| 2002/0019828 A1 | 2/2002 | Mortl | |
| 2002/0157023 A1 | 10/2002 | Callahan | |
| 2002/0169907 A1 | 11/2002 | Candea | |
| 2002/0184535 A1 * | 12/2002 | Moaven | G06F 21/6218 726/17 |
| 2003/0018786 A1 | 1/2003 | Lortz | |
| 2003/0021283 A1 | 1/2003 | See | |
| 2003/0046315 A1 | 3/2003 | Feig | |
| 2003/0074580 A1 * | 4/2003 | Knouse | H04L 63/0815 726/4 |
| 2003/0081621 A1 | 5/2003 | Godfrey | |
| 2003/0115322 A1 | 6/2003 | Moriconi | |
| 2003/0229848 A1 | 12/2003 | Arend | |
| 2004/0054791 A1 | 3/2004 | Chakraborty | |
| 2004/0073668 A1 | 4/2004 | Bhat | |
| 2004/0088560 A1 | 5/2004 | Danks | |
| 2004/0128394 A1 | 7/2004 | Knauerhase | |
| 2004/0267749 A1 | 12/2004 | Bhat | |
| 2005/0021978 A1 | 1/2005 | Bhat | |
| 2005/0149721 A1 | 7/2005 | Lu | |
| 2005/0182773 A1 | 8/2005 | Feinsnnith | |
| 2006/0015725 A1 * | 1/2006 | Voice | H04L 63/0245 713/168 |
| 2006/0053216 A1 | 3/2006 | Deokar | |
| 2006/0233340 A1 | 10/2006 | Tovino | |
| 2007/0124797 A1 | 5/2007 | Gupta | |
| 2007/0130289 A1 * | 6/2007 | Defazio | G06F 21/6218 709/218 |
| 2007/0156659 A1 | 7/2007 | Lim | |
| 2007/0169202 A1 * | 7/2007 | Goldberg | G06F 21/31 726/26 |
| 2007/0174831 A1 | 7/2007 | Lee | |
| 2007/0204337 A1 * | 8/2007 | Schnackenberg | H04L 63/105 726/11 |
| 2007/0220599 A1 | 9/2007 | Moen | |
| 2007/0226775 A1 * | 9/2007 | Andreasen | H04L 63/0227 726/1 |
| 2007/0234408 A1 | 10/2007 | Burch | |
| 2007/0289006 A1 * | 12/2007 | Ramachandran | H04L 9/3263 726/10 |
| 2008/0066148 A1 | 3/2008 | Lim | |
| 2008/0080479 A1 | 4/2008 | Maes | |
| 2008/0082834 A1 * | 4/2008 | Mattsson | G06F 21/6209 713/189 |
| 2008/0126301 A1 | 5/2008 | Bank | |
| 2008/0301437 A1 | 12/2008 | Chevalier | |
| 2008/0307517 A1 | 12/2008 | Grigoriev | |
| 2009/0048997 A1 * | 2/2009 | Manickam | H04L 63/0407 706/47 |
| 2009/0049512 A1 | 2/2009 | Manickam et al. | |
| 2009/0307474 A1 * | 12/2009 | Johnston | G06F 21/572 713/2 |
| 2010/0024019 A1 | 1/2010 | Backlund | |
| 2010/0064341 A1 | 3/2010 | Aldera | |
| 2010/0281524 A1 | 11/2010 | Ghittino | |
| 2011/0154473 A1 * | 6/2011 | Anderson | G06F 21/64 726/11 |
| 2011/0161332 A1 * | 6/2011 | Milman | G06F 21/6245 707/754 |
| 2011/0209194 A1 | 8/2011 | Kennedy | |
| 2011/0251992 A1 | 10/2011 | Bethlehem et al. | |
| 2011/0313981 A1 | 12/2011 | Ben-Natan | |
| 2012/0050005 A1 * | 3/2012 | Shuster | G06F 3/03543 340/5.6 |
| 2012/0110632 A1 | 5/2012 | Burghart | |
| 2012/0131164 A1 | 5/2012 | Bryan | |
| 2012/0197919 A1 * | 8/2012 | Chen | G06F 16/00 707/757 |
| 2012/0198467 A1 | 8/2012 | Jackson | |
| 2012/0239540 A1 * | 9/2012 | Rogers, Jr. | G06F 17/21 705/35 |
| 2013/0117313 A1 | 5/2013 | Miao | |
| 2013/0167192 A1 * | 6/2013 | Hickman | G06F 21/60 726/1 |
| 2013/0219176 A1 | 8/2013 | Akella | |
| 2013/0332982 A1 | 12/2013 | Rao et al. | |
| 2014/0007186 A1 * | 1/2014 | Agrawal | G06F 21/6209 726/1 |
| 2014/0012833 A1 | 1/2014 | Humprecht et al. | |
| 2014/0068699 A1 | 3/2014 | Balacheff | |
| 2014/0090085 A1 | 3/2014 | Mattsson et al. | |
| 2014/0123266 A1 * | 5/2014 | Carbou | H04L 63/0807 726/13 |
| 2014/0128053 A1 | 5/2014 | Merchant | |
| 2014/0152461 A1 | 6/2014 | Carlson et al. | |
| 2014/0165134 A1 | 6/2014 | Goldschlag | |
| 2014/0173700 A1 | 6/2014 | Awan | |
| 2014/0215322 A1 | 7/2014 | Gunderson | |
| 2014/0229596 A1 | 8/2014 | Burke | |
| 2014/0245372 A1 | 8/2014 | Elias | |
| 2014/0259094 A1 | 9/2014 | Narayanaswamy | |
| 2014/0304825 A1 | 10/2014 | Gianniotis | |
| 2014/0351573 A1 | 11/2014 | Martini | |

(56) References Cited

U.S. PATENT DOCUMENTS

| | | | |
|---|---|---|---|
| 2015/0055481 A1* | 2/2015 | Guo | H04L 45/121 |
| | | | 370/238 |
| 2015/0067881 A1 | 3/2015 | Badstieber et al. | |
| 2015/0113010 A1 | 4/2015 | Muthyala et al. | |
| 2015/0128205 A1 | 5/2015 | Mahaffey | |
| 2015/0221045 A1 | 8/2015 | Heckler et al. | |
| 2015/0324600 A1* | 11/2015 | Sethi | G06F 21/6218 |
| | | | 726/27 |
| 2015/0365401 A1* | 12/2015 | Brown | H04L 63/0838 |
| | | | 726/7 |
| 2015/0381660 A1 | 12/2015 | Hsiung | |
| 2016/0019402 A1 | 1/2016 | Khandelwal | |
| 2016/0080356 A1* | 3/2016 | Chougle | H04L 63/123 |
| | | | 726/5 |
| 2016/0149859 A1 | 5/2016 | Curtis | |
| 2016/0210578 A1* | 7/2016 | Raleigh | H04W 72/0453 |
| 2016/0217293 A1* | 7/2016 | Farkash | G06F 21/6209 |
| 2016/0277368 A1 | 9/2016 | Narayanaswamy | |
| 2016/0300231 A1* | 10/2016 | Shavell | G06Q 20/4016 |
| 2016/0342803 A1 | 11/2016 | Goodridge | |
| 2016/0366220 A1* | 12/2016 | Gottlieb | H04L 67/1095 |
| 2017/0012962 A1 | 1/2017 | Lissack | |
| 2017/0085534 A1* | 3/2017 | Iyer | G06F 16/258 |
| 2017/0093925 A1 | 3/2017 | Sheretov | |
| 2017/0132186 A1* | 5/2017 | Plummer | G09C 1/00 |
| 2017/0208033 A1 | 7/2017 | Roskind | |
| 2018/0131726 A1 | 5/2018 | Arumugam et al. | |
| 2018/0131727 A1 | 5/2018 | Arumugam et al. | |
| 2020/0259793 A1* | 8/2020 | Pangeni | H04L 63/0254 |

OTHER PUBLICATIONS

Extended European Search Report in European Application No. 16852450.2, dated Jul. 3, 2018, 8 pages.

International Application No. PCT/US2016/054107, Notification of Transmittal of the International Search Report and the Written Opinion of the International Searching Authority, dated Jan. 9, 2017, 13 pages.

International Application No. PCT/US2016/065853, Notification of Transmittal of the International Search Report and the Written Opinion of the International Searching Authority, dated Mar. 24, 2017, 14 pages.

"Non Final Office Action Issued in U.S. Appl. No. 14/965,055", dated Jun. 1, 2017, 23 Pages.

Office Action Issued in Israel Patent Application No. 258426, dated Dec. 16, 2019, 3 Pages. (with English Translation).

"Non Final Office Action Issued in U.S. Appl. No. 15/862,528", dated Jul. 28, 2020, 12 Pages.

* cited by examiner

POLICY ENFORCEMENT SYSTEM

CROSS-REFERENCE TO RELATED APPLICATIONS

This application is a continuation application of and claims priority to U.S. application Ser. No. 15/864,886, filed on Jan. 8, 2018, which is a continuation application of and claims priority to U.S. application Ser. No. 14/868,265, filed on Sep. 28, 2015.

BACKGROUND

A framework, e.g., Apache Hadoop, can be deployed to manage distributed storage and distributed processing of large data sets on clusters of many computers, i.e., nodes, which may be physical or virtual. The framework can include multiple components to be run on different nodes in the cluster. Each component can be responsible for a different task. For example, a first component, e.g., Hadoop Distributed File System (HDFS), can implement a file system, and a second component, e.g., Hive, can implement a database access layer. The components work together to distribute processing of a workload of files among the nodes in the cluster.

When managing data access at the cluster, a file system component, e.g., HDFS, can include a master node, e.g., a Name Node, that manages a file system namespace and regulates access to files. The master node can store a mapping of data in the files to one or more slave nodes, e.g., Data Nodes. The slave nodes can store the files and serve read and write requests from client devices.

SUMMARY

In general, this specification describes a policy enforcement system.

In general, one innovative aspect of the subject matter described in this specification can be embodied in methods that include the actions of storing, by a policy enforcement system, a plurality of policies and data associating a plurality of user credentials with the plurality of policies; receiving, from a client device by the policy enforcement system, a request for data from a file system, the request further comprising user credentials; forwarding, by the policy enforcement system, the request to a first node; receiving, from the first node, a redirect request comprising data specifying a second node that stores the data from the file system; appending, by the policy enforcement system, the user credentials to the redirect request to generate a custom redirect request; responding to the client device with the custom redirect request; receiving, from the client device, a request for data from the second node, the request for data from the second node having the user credentials; forwarding, by the policy enforcement system, the request for data from the second node to the second node that stores the data from the file system; receiving the data from the file system from the second node; selecting from the plurality of policies, based on the received user credentials and the data associating the plurality of user credentials with the plurality of policies, one or more policies that correspond to the received user credentials; filtering, by the policy enforcement system, the data from the file system based on the one or more policies; and sending the filtered data to the client device.

Implementations can include one or more of the following features. The one or more policies cause the policy enforcement system to only include, in the filtered data, data accessible using the user credentials. Appending the user credentials to the redirect request comprises: encrypting the user credentials; and appending the encrypted user credentials to the redirect request. The data from the file system is organized by a table of columns and rows, wherein filtering the data from the file system comprises: determining, based on the one or more policies associated with the user credentials, that one or more columns of data in the table are restricted; and masking the one or more columns of data. The masking comprises encrypting or tokenizing the data. The user credentials comprise a user id and a group id, and wherein the user id is associated with a first collection of policies, and wherein the group id is associated with a second collection of policies. Prior to the storing, receiving user input at a user interface associated with the policy enforcement system, the user input specifying one or more policies associated with the user credentials. The data specifying the second node that stores the file system is an Internet Protocol address. The first node is a name node and the second node is a data node. The first node stores a database associating a file system with one or more nodes at which the file system is stored.

Another innovative aspect includes storing, by a policy enforcement system, a plurality of policies and data associating a plurality of user credentials with the plurality of policies; receiving, from a client device by the policy enforcement system, a request for data from a file system, the request further comprising user credentials; forwarding, by the policy enforcement system, the request for data to a second node that stores the data from the file system; receiving, from the node, the data from the file system; selecting from the plurality of policies, based on the received user credentials and the data associating the plurality of user credentials with the plurality of policies, one or more policies that correspond to the received user credentials; filtering, by the policy enforcement system, the data from the file system based on the one or more policies; and sending the filtered data to the client device.

Particular embodiments of the subject matter described in this specification can be implemented so as to realize one or more of the following advantages. Traditionally, a file system executes queries for data as long as users providing the queries have proper read or write access. With proper access permissions, the file system returns the data without any filters or modifications. Using policies, the policy enforcement system can mask particular portions of the data that may be sensitive, e.g., personally identifiable information such as social security numbers or dates of birth. This can provide an additional layer of privacy for user data stored in the file system. Also, when communicating with the file system, the system operates without interfering with existing communication protocols between a client and nodes within the file system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Sensitive data, such as personally identifiable data, can be stored in a file system, e.g., HDFS, in the cloud. There can be restrictions to read or write access for some users due to the sensitivity of the data. Typical file systems can, in response to a request for data without authorized user credentials, send a response indicating unauthorized access to the data. However, it can be desirable for a client device to receive a modified version of the data instead of a response indicating unauthorized access.

Thus, a policy enforcement system communicating with a file system can provide a masked version of the sensitive data. This can enable the users to access portions of the sensitive data without having the sensitive data be entirely exposed. The system is operable even where data is stored in a framework that includes name nodes and data notes, e.g., HDFS.

Figure 1:
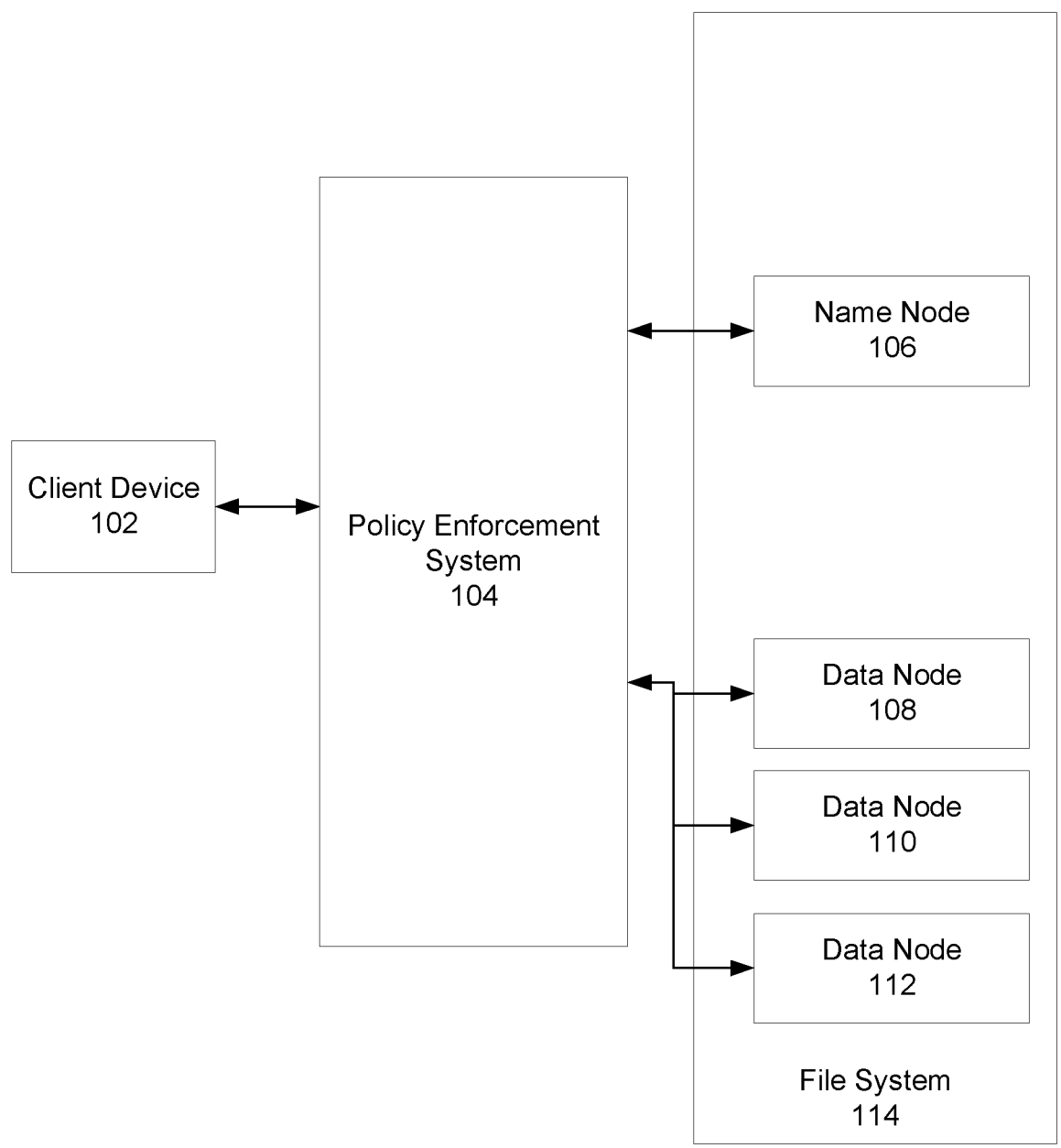
FIG. 1 illustrates an example architecture for integrating a policy enforcement system with a file system.

FIG. 1 illustrates an example architecture for integrating a policy enforcement system 104 with a file system 114. A client device 102 can communicate with the policy enforcement system 104. The client device 102 can include a memory, e.g., a random access memory (RAM), for storing instructions and data and a processor for executing stored instructions. The memory can include both read only and writable memory. For example, the client device 102 can be a computer coupled to the policy enforcement system 104 through a data communication network, e.g., local area network (LAN) or wide area network (WAN), e.g., the Internet, or a combination of networks. Communication over the network can occur using TCP/IP protocols.

The client device 102 can send a request to retrieve data from a file system 114. The request for data can be sent to the policy enforcement system 104. The policy enforcement system 104 can include one or more computers configured to implement policies for the file system.

Policies limit access to portions of data stored in the file system 114. By way of illustration, data in the file system 114 can be stored in a table of rows and columns. Some columns in the table may include data about, e.g., names, dates of birth, phone numbers, credit card information, social security numbers, or other personal information. The rows can include data about the individuals, e.g. sorted by unique identifier. Some policies allow user credentials of one particular person to access data from a column, or can allow user credentials of a group of people to access data from a column. Some other policies prevent any user from accessing complete data from a column. Policies can restrict access to these columns in the data to users with approved user credentials. This will be described in further detail with reference to FIG. 3. In some implementations, policies are applicable to other formats for the data. The other formats can include unstructured data, key-value stores, document stores, or graphs.

Thus, each policy can be associated with user credentials of one or more users. Multiple user credentials can also be associated with one policy. User credentials can include a user identification, a group identification, or both. In some implementations, the user identification is associated with a first collection of policies and the group identification is associated with a second collection of policies. These policies can be stored in an internal database of the policy enforcement system 104. An example policy can be a data structure that specifies a policy identifier, a column, and a function to be executed on the column, e.g., mask everything except the last four characters of data in the column. An example association can be stored in a table with a column for a user credential identifier and a column for a policy identifier with a user credential identifier associated with the policy identifier in the same row.

In some implementations, an administrator can generate a policy using a user interface that communicates with the policy enforcement system 104. The administrator can provide, at the user interface, user input specifying one or more policies associated with particular user credentials, and the policy enforcement system 104 can store the one or more policies and the associations in the internal database.

The policies can be used when the policy enforcement system 104 processes a request from the client device 102, which will be described further below with reference to FIGS. 2 and 3.

The file system 114 includes a name node 106 and data nodes 108-112. The name node 106 can be a master node and the data nodes 108-112 can be slave nodes. The file system 114 can be HDFS.

The name node 106 stores a mapping of data to data nodes that store the respective data. Therefore, when the name node 106 receives a request for a particular portion of data, the name node 106 can respond with a list of addresses, e.g., Internet Protocol (IP) addresses, of data nodes that store the particular portion of data based on the mapping. In some implementations, the name node 106 and the data nodes 108-112 are each on different machines.

Figure 2:
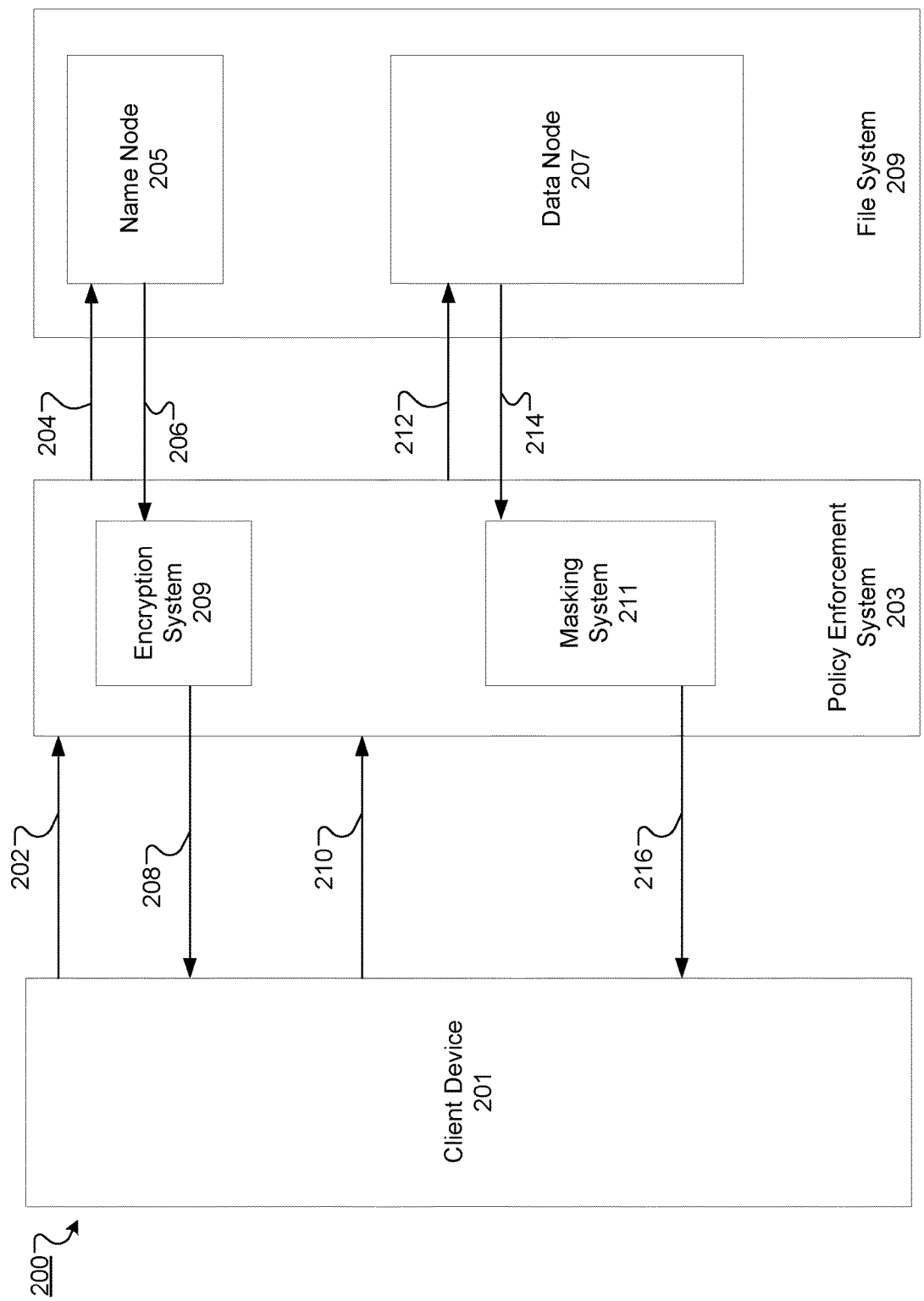
FIG. 2 is a diagram of how a request is processed by a policy enforcement system communicating with a file system.

FIG. 2 is a diagram of how a request is processed by a policy enforcement system 203 communicating with a file system 209. A client device 201 can send a request for data from the file system 209 to the policy enforcement system 203 (step 202). In some implementations, the client device 201 sends the request intended for a name node 205, but the policy enforcement system 203 intercepts the request, e.g., using IP spoofing. The request can include user credentials. In some implementations, the policy enforcement system 203 stores the user credentials in an internal database for later use. The policy enforcement system 203 can also store multiple policies in the internal database and associations of the one or more of the policies with the user credentials, e.g., using a user interface described in FIG. 1. In some implementations, the file system 209 and the policy enforcement system 203 operate on separate computers.

In some implementations, the user credentials stored in the internal database are independent of or in addition to user credentials in the file system 209 and the client device 201. That is, the policy enforcement system 203 can manage, e.g., through the user interface, user credentials that are not managed by the file system 209 or the client device 201. In some implementations, the user credentials at the policy enforcement system 203 have group identifiers or category identifiers. Policies can apply a masking function, which will be described below, to data associated with user credentials of particular group or category identifiers.

The policy enforcement system 203 can forward the request to the name node 205 of the file system 209 (step 204). The name node 205 can process the request to identify that data node 207 stores the data from the request, e.g., using a mapping of data to nodes. In some implementations, the name node 205 only processes the request upon authenticating the request using the user credentials. The name node 205 generates a redirect request including the identified data node 207 and sends the redirect request to an encryption system 209 of the policy enforcement system 203 (step 206).

The encryption system 209 can append the user credentials to the redirect request to generate a custom redirect request.

In some implementations, the encryption system 209 encrypts the user credentials and then appends the encrypted user credentials to the redirect request. The encryption system 209 can encrypt using conventional cryptographic techniques such as symmetric or public key encryption. The encryption system 209 can send the custom redirect request to the client device 201 (step 208). The client device 201 can generate and send a second request for data from the data node 207 identified by the name node 205 (step 210). The second request can be directed to an IP address for the data node 207.

The policy enforcement system 203 can receive the request for data from the data node 207 and forward the request to the data node 207 (step 212). The data node 207 can process the request by retrieving the data from the request from storage and generate a response with the retrieved data. The data node 207 can send the response to a masking system 211 of the policy enforcement system 203 (step 214).

The masking system 211 can select, e.g., from the internal database, one or more policies that are associated with the user credentials from the initial request of the client device 201, i.e., the user credentials from step 202. For example, the masking system 211 can generate a structured query language (SQL) query that retrieves the policies associated with an identifier for the user credentials. If the internal database stores multiple policies for the user credentials, the masking system 211 can apply each specified function in the respective policy to the data from the data node 207. The masking system 211 can filter the data received from the data node 207 based on the selected policies. This will be described further below with reference to FIG. 3. The policy enforcement system 203 can send the filtered data to the client device (step 201). In some implementations, the name node 205 and data node 207 send requests intended for the client device 201, but the policy enforcement system 203 intercepts the requests, e.g., using IP spoofing.

Figure 3:
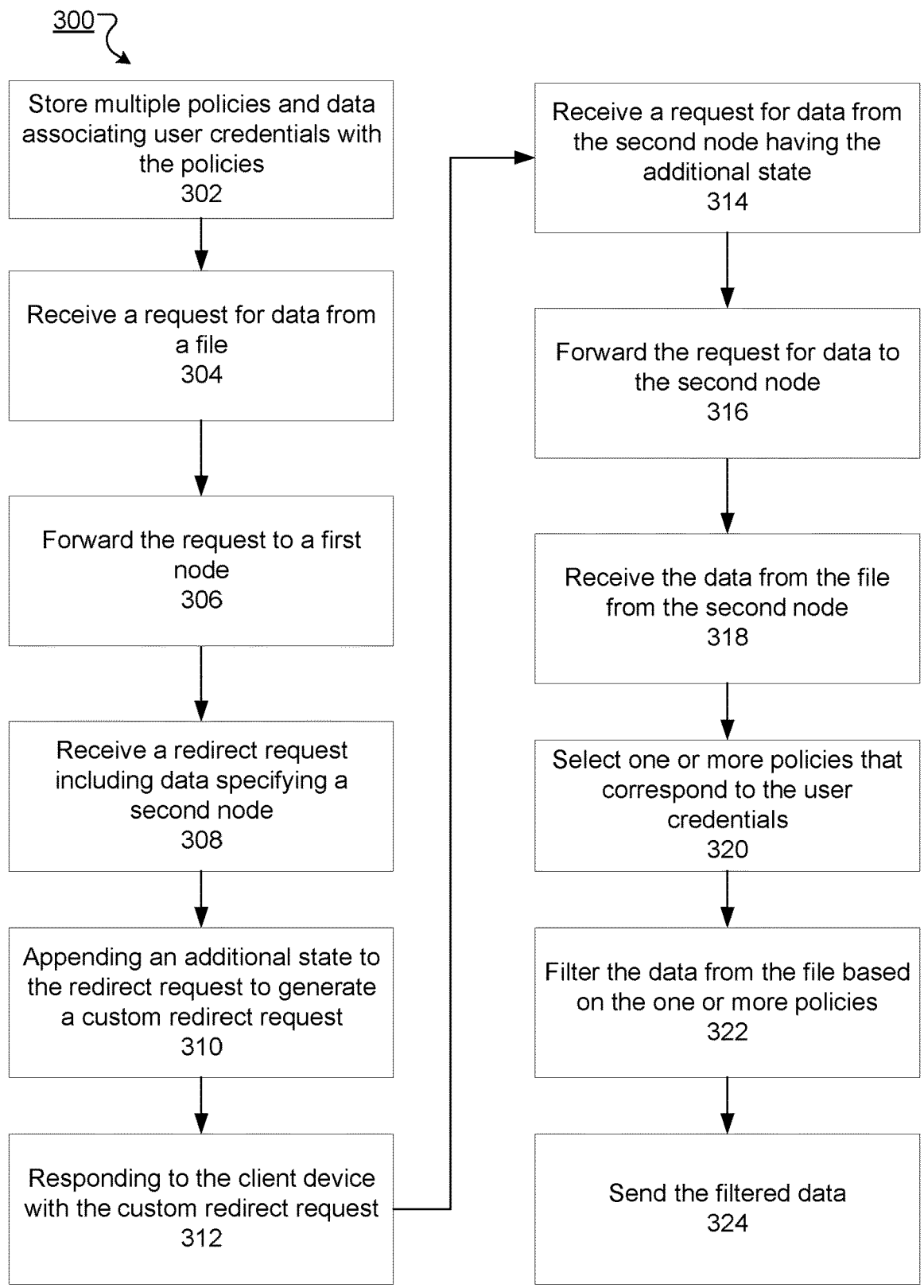
FIG. 3 is a flow diagram of an example method for processing a request for data by the policy enforcement system communicating with a client and two nodes.

FIG. 3 is a flow diagram of an example method 300 for processing a request for data by the policy enforcement system communicating with a client and two nodes. For convenience, the method 300 will be described with respect to a system, e.g., the policy enforcement system 104 of FIG. 1, having one or more computing devices that execute software to implement the method 300.

The system stores multiple policies and data associating user credentials with the multiple policies (step 302). This can be stored in an internal database as described above. A client device sends a request for data from a file system, and the system receives the request (step 304). The request includes user credentials.

The system forwards the request to a first node (step 306). The first node can be a name node. The first node generates a redirect request and the system receives, from the first node, the redirect request (step 308). The redirect request includes data specifying at least a second node that stores the data from the file system. The second node can be a data node. The system appends the user credentials to the redirect request to generate a custom redirect request (step 310). In some implementations, the system encrypts the user credentials.

The system responds to the client device with the custom redirect request (step 312). The system receives, from the client device, a request for data from the second node (step 314). The request for data from the second node can have the encrypted user credentials. In some implementations, the system decrypts the user credentials to temporarily store the user credentials. The system forwards the request for data from the second node to the second node, which stores the data from the file system (step 316).

The second node retrieves the data from storage, and the system receives, from the second node, the data from the file system (step 318). The system selects, from multiple policies stored in the database, one or more policies that correspond to the received user credentials based on the received user credentials and the data associating the user credentials with the multiple policies (step 320).

The system filters the data from the file system based on the one or more policies (step 322). In some implementations, the system iterates through each row entry in the data from the second node and executes a string replace as specified by the one or more policies. By way of illustration, the data can be organized in a table of rows and columns in Table 1.

TABLE 1

| name | social-security-number | date-of-birth |
|---|---|---|
| John Smith | 123-45-6789 | 12-34-56 |
| Jane Smith | 111-22-3333 | 11-22-33 |

The one or more policies can specify one or more columns of the table that are restricted. For example, the one or more policies can specify columns named "social-security-number" or "date-of-birth" should be masked.

The system can filter the data by masking a portion of the columns. The policy can specify the portion to be masked. Any characters in the masked portion of the column can be replaced by masking characters, e.g., 'x', '*' or '#'.

The policy can also have a predicate that determines whether the data is filtered or not. For example, the predicate can be whether the data has a particular regular expression in a programming language like JavaScript. If the predicate evaluates to true, the system can mask the data. In some implementations, the system also encrypts or tokenizes the data before sending the data to the client device, e.g., using a custom encryption or tokenization function. The client device can then decrypt or detokenize the data.

By way of illustration, the policy can specify for a "social-security-number" column only a last four characters can be provided to the client device and that for a "date-of-birth" column only the year can be provided to the client device. Therefore, the system can replace any character that is not in the last four characters with an 'x'. See Table 2.

TABLE 2

| name | social-security-number | date-of-birth |
|---|---|---|
| John Smith | xxx-xx-6789 | xx-xx-56 |
| Jane Smith | xxx-xx-3333 | xx-xx-33 |

The system can also filter the data by simply not returning one or more columns. For example, a policy can specify that "social-security-number" column will not be provided to the client device.

The system then sends the filtered data to the client device (step 324). In this way, the system, as integrated with the file system, does not interfere with existing file retrieval protocols between client devices and file systems.

Also, the system can provide an additional level of security without requiring the client device to handle a different data structure, which minimizes cost and complexity of integrating the system. By way of illustration, the client device expects a data structure with three columns based on request for data from "name", "social-security-number", and "date-of-birth" columns. The system can provide a data structure with the "name", "social-security-number", and "date-of-birth" columns, although data within the columns are masked.

Figure 4:
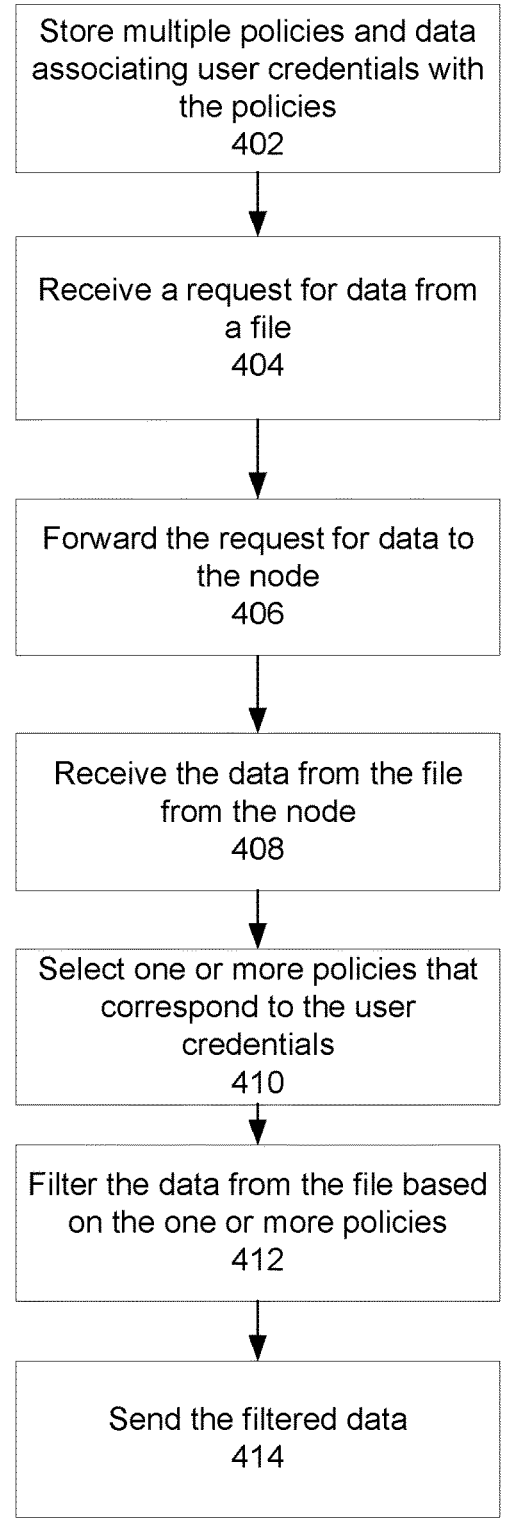
FIG. 4 is a flow diagram of example method for processing a request for data by the policy enforcement system communicating with a client and one node.

FIG. 4 is a flow diagram of example method for processing a request for data by the policy enforcement system communicating with a client and one node. With one node, the system can skip generating and forwarding redirect requests as described in FIG. 3. For convenience, the method 400 will be described with respect to a system, e.g., the policy enforcement system 104 of FIG. 1, having one or more computing devices that execute software to implement the method 400.

The system stores multiple policies and data associating user credentials with the multiple policies (step 402). This can be stored in an internal database as described above. A client device sends a request for data from a file system, and the system receives the request (step 404). The request includes user credentials. The system forwards the request for data to a node that which stores the data (step 406). The node can operate a database.

The node retrieves the data from storage, and the system receives, from the node, the data from the file system (step 408). The system selects, from multiple policies stored in the database, one or more policies that correspond to the received user credentials based on the received user credentials and the data associating the user credentials with the multiple policies (step 410).

The system filters the data from the file system based on the one or more policies (step 412), as described above with reference to FIG. 3. The system then sends the filtered data to the client device (step 414).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving from a client device, by a policy enforcement system, a request for first data from a data node of a file system, the request including one or more user credentials that identify the client device and being sent by the client device based on receiving a customized redirect request from the policy enforcement system, the customized redirect request comprising a redirect request, received from a name node of the file system, to which the one or more user credentials have been appended by the policy enforcement system;
intercepting, by the policy enforcement system, a communication from the data node to the client device, the communication containing the first data,
the policy enforcement system storing a plurality of policies and data associating a plurality of user credentials with the plurality of policies;
selecting, by the policy enforcement system, based on the user credentials and the data associating the plurality of user credentials with the plurality of policies, one or more policies that correspond to the user credentials from the plurality of policies;
filtering, by the policy enforcement system, the first data based on the one or more policies to generate filtered data by inserting one or more masking characters in one or more data entries of the data; and
sending the filtered data to the client device via the network.

2. The method of claim 1, wherein at least one of the selected policies includes a predicate that determines whether the first data includes information that is to be filtered, and
wherein the first data is filtered based on the predicate.

3. The method of claim 2, wherein the information is a particular regular expression in a programming language.

4. The method of claim 1, wherein the policy enforcement system is logically positioned between the client device and the file system, and the policy enforcement system does not interfere with existing file retrieval protocols between the client device and the file system.

5. The method of claim 1, wherein the file system is a distributed storage comprising a plurality of slave nodes that store data and a master node that stores mapping of the data to the plurality of slave nodes, wherein the data node is a slave node.

6. The method of claim 5, further comprising receiving, by the policy enforcement system, an identification of the data node from the master node and based on the first data requested by the client device.

7. The method of claim 1, wherein the first data is organized by a table of columns and rows, wherein filtering the first data comprises:
 determining, based on the one or more policies associated with the user credentials, that one or more columns of the first data in the table are restricted; and
 masking the one or more columns, wherein the one or more columns include the one or more data entries.

8. A system comprising:
 a file system that stores data; and
 a policy enforcement system in communication with the file system, the policy enforcement system comprising:
  a processor, and
  a non-transitory computer-readable medium coupled to the processor and having instructions stored thereon, which, when executed by the processor, cause the processor to perform operations comprising:
   receiving from a client device, by the policy enforcement system, a request for first data from a data node of a file system, the request including one or more user credentials that identify the client device and being sent by the client device based on receiving a customized redirect request from the policy enforcement system, the customized redirect request comprising a redirect request, received from a name node of the file system, to which the one or more user credentials have been appended by the policy enforcement system;
   intercepting over a network, by the policy enforcement system, a communication sent via the network from the data node to the client device, the communication containing the first data,
    the policy enforcement system storing a plurality of policies and data associating a plurality of user credentials with the plurality of policies,
   selecting based on the user credentials and the data associating the plurality of user credentials with the plurality of policies, one or more policies that correspond to the user credentials from the plurality of policies,
   filtering the first data based on the one or more policies to generate filtered data by inserting one or more masking characters in one or more data entries of the data, and
   sending the filtered data to the client device via the network.

9. The system of claim 8, wherein at least one of the selected policies includes a predicate that determines whether the first data includes information that is to be filtered, and
 wherein the first data is filtered based on the predicate.

10. The system of claim 9, wherein the information is a particular regular expression in a programming language.

11. The system of claim 8, wherein the policy enforcement system is logically positioned between the client device and the file system, and the policy enforcement system does not interfere with existing file retrieval protocols between the client device and the file system.

12. The system of claim 8, wherein the file system is a distributed storage comprising a plurality of slave nodes that store data and a master node that stores mapping of the data to the plurality of slave nodes, wherein the data node is a slave node.

13. The system of claim 12, wherein the operations further comprise receiving, by the policy enforcement system, an identification of the data node from the master node and based on the first data requested by the client device.

14. A computer-readable storage medium having instructions stored thereon, which, when executed by a processor, cause the processor to perform operations comprising:
 receiving from a client device, by a policy enforcement system, a request for first data from a data node of a file system, the request including one or more user credentials that identify the client device and being sent by the client device based on receiving a customized redirect request from the policy enforcement system, the customized redirect request comprising a redirect request, received from a name node of the file system, to which the one or more user credentials have been appended by the policy enforcement system;
 intercepting over a network, by the policy enforcement system, a communication sent via the network from the data node to the client device, the communication containing the first data,
  the policy enforcement system storing a plurality of policies and data associating a plurality of user credentials with the plurality of policies;
 selecting based on the user credentials and the data associating the plurality of user credentials with the plurality of policies, one or more policies that correspond to the user credentials from the plurality of policies;
 filtering the first data based on the one or more policies to generate filtered data by inserting one or more masking characters in one or more data entries of the data; and
 sending the filtered data to the client device via the network.

15. The computer-readable storage medium of claim 14, wherein at least one of the selected policies includes a predicate that determines whether the first data includes information that is to be filtered, and wherein the first data is filtered based on the predicate.

16. The computer-readable storage medium of claim 15, wherein the information is a particular regular expression in a programming language.

17. The computer-readable storage medium of claim 14, wherein the policy enforcement system is logically positioned between the client device and the file system, and the policy enforcement system does not interfere with existing file retrieval protocols between the client device and the file system.

18. The computer-readable storage medium of claim 14, wherein the file system is a distributed storage comprising a plurality of slave nodes that store data and a master node that stores mapping of the data to the plurality of slave nodes, wherein the data node is a slave node.

19. The computer-readable storage medium of claim 18, wherein the operations further comprise receiving, by the policy enforcement system, an identification of the data node from the master node and based on the first data requested by the client device.

20. The computer-readable storage medium of claim 14, wherein the first data is organized by a table of columns and rows, wherein filtering the first data comprises:

determining, based on the one or more policies associated with the user credentials, that one or more columns of the first data in the table are restricted; and masking the one or more columns, wherein the one or more columns include the one or more data entries.

* * * * *